US011085328B2

(12) United States Patent
Kroeger et al.

(10) Patent No.: US 11,085,328 B2
(45) Date of Patent: Aug. 10, 2021

(54) ASSEMBLY FOR SEALING AN ANNULAR GAP BETWEEN AN INNER STRUCTURE AND AN OUTER STRUCTURE

(71) Applicant: Rohr, Inc., Chula Vista, CA (US)

(72) Inventors: Daniel Kroeger, San Diego, CA (US); Jasen Miner, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 59 days.

(21) Appl. No.: 16/564,566

(22) Filed: Sep. 9, 2019

(65) Prior Publication Data
US 2021/0071545 A1    Mar. 11, 2021

(51) Int. Cl.
| | | |
|---|---|---|
| *F01D 25/14* | (2006.01) | |
| *F01D 25/02* | (2006.01) | |
| *F02C 7/04* | (2006.01) | |
| *F02C 7/28* | (2006.01) | |
| *F02C 7/047* | (2006.01) | |

(52) U.S. Cl.
CPC .............. *F01D 25/14* (2013.01); *F01D 25/02* (2013.01); *F02C 7/047* (2013.01); *F02C 7/28* (2013.01); *F05D 2240/14* (2013.01); *F05D 2240/55* (2013.01); *F05D 2260/208* (2013.01)

(58) Field of Classification Search
CPC .......... F01D 25/14; F01D 25/02; F02C 7/047; F02C 7/28; F05D 2240/14; F05D 2240/55; F05D 2260/208
USPC ......................................................... 415/117
See application file for complete search history.

(56) References Cited

U.S. PATENT DOCUMENTS

| | | | | |
|---|---|---|---|---|
| 2,764,506 A | * | 9/1956 | Piccard ............... | C08L 2666/04 442/117 |
| 2,825,587 A | * | 3/1958 | Barta ....................... | F16L 47/02 285/285.1 |
| 3,436,021 A | * | 4/1969 | Walton ....................... | F02K 9/84 239/265.35 |
| 3,559,730 A | | 2/1971 | Denjean | |
| 4,351,365 A | | 9/1982 | Bauermeister | |

(Continued)

FOREIGN PATENT DOCUMENTS

| | | |
|---|---|---|
| DE | 102016100598 A1 | 7/2017 |
| EP | 1318283 A1 | 6/2003 |

OTHER PUBLICATIONS

Machine Translation to Feber (Pub. No. DE 102016100598 A1), published on Jul. 20, 2017.*
EP search report for EP19212404.8 dated Mar. 17, 2020.

*Primary Examiner* — Thai Ba Trieu
(74) *Attorney, Agent, or Firm* — Getz Balich LLC

(57) ABSTRACT

A system is provided for a nacelle of an aircraft propulsion system. This system includes a tubular outer structure, a tubular inner structure and a seal assembly. The tubular inner structure projects through a bore of the tubular outer structure. The seal assembly is configured to close an end of an annulus between the tubular outer structure and the tubular inner structure. The seal assembly includes a seal land and a seal element. The seal land includes a seal land mount that circumscribes and is attached to the tubular inner structure. The seal land mount is configured with a v-shaped sectional geometry. The seal element is attached to the tubular outer structure. The seal element circumscribes and is sealingly engaged with the seal land. The seal element may be configured from or otherwise includes a polymer material.

20 Claims, 12 Drawing Sheets

(56) References Cited

U.S. PATENT DOCUMENTS

| | | | |
|---|---|---|---|
| 4,691,741 A * | 9/1987 | Affa | F16L 59/07 |
| | | | 138/113 |
| 5,220,785 A * | 6/1993 | Miller | F02C 7/047 |
| | | | 244/134 R |
| RE36,215 E | 6/1999 | Rosenthal | |
| 6,003,814 A | 12/1999 | Pike | |
| 6,354,538 B1 | 3/2002 | Chilukuri | |
| 7,900,872 B2 | 3/2011 | Sternberger | |
| 7,931,235 B2 | 4/2011 | Zanarelli | |
| 8,308,110 B2 | 11/2012 | Porte | |
| 8,800,258 B2 * | 8/2014 | Vauchel | B64D 33/02 |
| | | | 60/39.093 |
| 9,010,084 B2 * | 4/2015 | Chelin | B64D 33/02 |
| | | | 181/214 |
| 9,097,124 B2 * | 8/2015 | Dube | F01D 5/16 |
| 9,382,808 B2 * | 7/2016 | Hodgkinson | F01D 11/005 |
| 9,403,599 B2 | 8/2016 | Binks | |
| 9,517,830 B2 * | 12/2016 | Hariram | F16J 15/121 |
| 9,528,442 B2 | 12/2016 | Trinh | |
| 9,835,090 B2 * | 12/2017 | Exner | F02C 7/28 |
| 9,845,728 B2 | 12/2017 | Brown | |
| 10,145,256 B2 * | 12/2018 | Ratajac | F02C 7/28 |
| 10,634,060 B2 * | 4/2020 | Song | F02C 7/28 |
| 10,814,995 B2 * | 10/2020 | West | B64D 27/26 |
| 2010/0066032 A1 * | 3/2010 | Girman | F16J 15/322 |
| | | | 277/522 |
| 2015/0176490 A1 | 6/2015 | Trinh | |
| 2016/0114898 A1 * | 4/2016 | Llamas Castro | F02C 7/047 |
| | | | 415/177 |
| 2018/0128173 A1 | 5/2018 | Lemarchand | |
| 2018/0142645 A1 * | 5/2018 | Lu | B64D 29/06 |
| 2018/0194485 A1 | 7/2018 | Chilukuri | |
| 2018/0258858 A1 * | 9/2018 | Moniz | F02C 7/28 |
| 2018/0298772 A1 * | 10/2018 | Ratajac | F02C 7/28 |
| 2019/0061966 A1 * | 2/2019 | West | B64D 29/06 |
| 2020/0109644 A1 * | 4/2020 | Pretty | F01D 25/14 |
| 2020/0141317 A1 * | 5/2020 | Kroeger | F02C 7/047 |
| 2020/0189750 A1 * | 6/2020 | Kroeger | F02C 7/047 |
| 2020/0284191 A1 * | 9/2020 | Kroeger | F02C 7/28 |

* cited by examiner

ASSEMBLY FOR SEALING AN ANNULAR GAP BETWEEN AN INNER STRUCTURE AND AN OUTER STRUCTURE

BACKGROUND

1. Technical Field

This disclosure relates generally to an aircraft propulsion system and, more particularly, to sealing a gap between elements of the aircraft propulsion system.

2. Background Information

A nacelle for an aircraft propulsion system may be configured with a thermal anti-icing system for mitigating or preventing formation of ice on an airflow inlet to the propulsion system. One such thermal anti-icing system bleeds relatively hot air from a compressor in a turbine engine of the aircraft propulsion system. This hot air is routed through a conduit and injected into a cavity in a portion of the nacelle defining the airflow inlet. Given the relatively high temperature of the hot air within the conduit, expensive and/or complicated seal assemblies are used to provide seals between the conduit and a bulkhead/firewall within the nacelle through which the conduit extends. While these known seal assemblies have various advantages, there is still room in the art for improvement. There is a need in the art therefore for an improved seal assembly for engaging with a conduit of a thermal anti-icing system.

SUMMARY OF THE DISCLOSURE

According to an aspect of the present disclosure, a system is provided for a nacelle of an aircraft propulsion system. This system includes a tubular outer structure, a tubular inner structure and a seal assembly. The tubular inner structure projects through a bore of the tubular outer structure. The seal assembly is configured to close an end of an annulus between the tubular outer structure and the tubular inner structure. The seal assembly includes a seal land and a seal element. The seal land includes a seal land mount, which seal land mount circumscribes and is attached to the tubular inner structure. The seal land mount is configured with a v-shaped sectional geometry. The seal element is attached to the tubular outer structure. The seal element circumscribes and is sealingly engaged with the seal land. The seal element may be configured from or otherwise includes a polymer material.

According to another aspect of the present disclosure, a nacelle system is provided for an aircraft propulsion system. This nacelle system includes a nacelle system component, an inner structure and a seal assembly. The inner structure is located in an aperture of the nacelle system component. The seal assembly is configured to seal a gap between the inner structure and the nacelle system component. The seal assembly includes a seal land and a seal element. The seal land includes a seal land mount and a seal land tube connected to the inner structure by the seal land mount. The seal land mount extends along a path from the inner structure to the seal land tube. A length of the path is at least two times greater than a shortest distance from the inner structure to the seal land tube. The seal element is attached to the nacelle system component. The seal element circumscribes and is sealingly engaged with the seal land tube. The seal element may be configured from or otherwise includes a polymer material.

According to still another aspect of the present disclosure, a nacelle system is provided for an aircraft propulsion system. This nacelle system includes a component, an inner structure and a seal assembly. The inner structure is within an opening of the component. The seal assembly is configured to seal a gap between the inner structure and the component. The seal assembly includes a seal land, a polymer seal element and a non-polymer seal element. The seal land circumscribes and is mounted to the inner structure. The seal land is configured to provide a restrictive heat conduction path from the inner structure to an outer surface of the seal land. The polymer seal element and the non-polymer seal element are attached to the component at a common location. The polymer seal element circumscribes and is sealingly engaged with the outer surface of the seal land. The non-polymer seal element circumscribes and is sealingly engaged with the seal land.

The nacelle system component/the component may be configured as or otherwise include a tubular outer structure or a bulkhead. The seal assembly may also include a second seal element. The second seal element may be attached to the outer structure. The seal element may circumscribe and be sealingly engaged with the seal land. The seal element may be configured from or otherwise include a metal material.

The seal land mount may be configured with the v-shaped sectional geometry in a plane that is parallel with a centerline of the tubular inner structure.

The seal land may also include a seal land tube. The seal land mount may extend along a path from the tubular inner structure to the seal land tube. A length of the path may be at least four times greater than a shortest distance from the tubular inner structure to the seal land tube. The seal element may circumscribe and be sealingly engaged with the seal land tube.

The seal land may be configured to provide a restrictive heat conduction path from the tubular inner structure to an outer surface of the seal land. The seal element may circumscribe and contact the outer surface of the seal land.

The seal land mount may include an inner conical element and an outer conical element. An inner end of the inner conical element may be attached to the tubular inner structure. An outer end of the inner conical element may be connected to an inner end of the outer conical element.

The seal land may also include a seal land tube. An outer end of the outer conical element may be connected to and radially within the seal land tube. The seal element may circumscribe and contact the seal land tube.

The seal land may also include a second seal land mount. The second seal land mount may include a second inner conical element and a second outer conical element. An inner end of the second inner conical element may be attached to the tubular inner structure. An outer end of the second inner conical element may be connected to an inner end of the second outer conical element. An outer end of the second outer conical element may be connected to and radially within the seal land tube.

The seal land may also include a seal land tube. The seal land mount may connect the seal land tube to the tubular inner structure. The seal element may circumscribe and contact the seal land tube.

The seal land may also include an annular array of cooling elements.

The seal element may also include fibrous material embedded within the polymer material.

The seal assembly may also include a second seal element attached to the tubular outer structure. The second seal element may circumscribe and be engaged with the seal land. The second seal element may be configured from or otherwise include a metal material.

The second seal element may be configured as a turkey feather seal element.

The seal element may be clamped between the tubular outer structure and the second seal element.

The seal land may also include a seal land tube. The seal land mount may connect the seal land tube to the tubular inner structure. The second seal element may circumscribe and contact the seal land tube.

The seal land may also include a seal land tube and a plurality of cooling elements. The seal land mount may connect the seal land tube to the tubular inner structure. The cooling elements may be arranged circumferentially about the seal land tube. Each of the cooling elements may project radially out from the seal land tube.

The second seal element may circumscribe the seal land tube. The second seal element may axially contact one or more of the cooling elements.

The system/the nacelle system may also include an anti-icing system for an inlet structure of the nacelle. The anti-icing system may include the tubular inner structure.

The foregoing features and the operation of the invention will become more apparent in light of the following description and the accompanying drawings.

DETAILED DESCRIPTION

Figure 1:
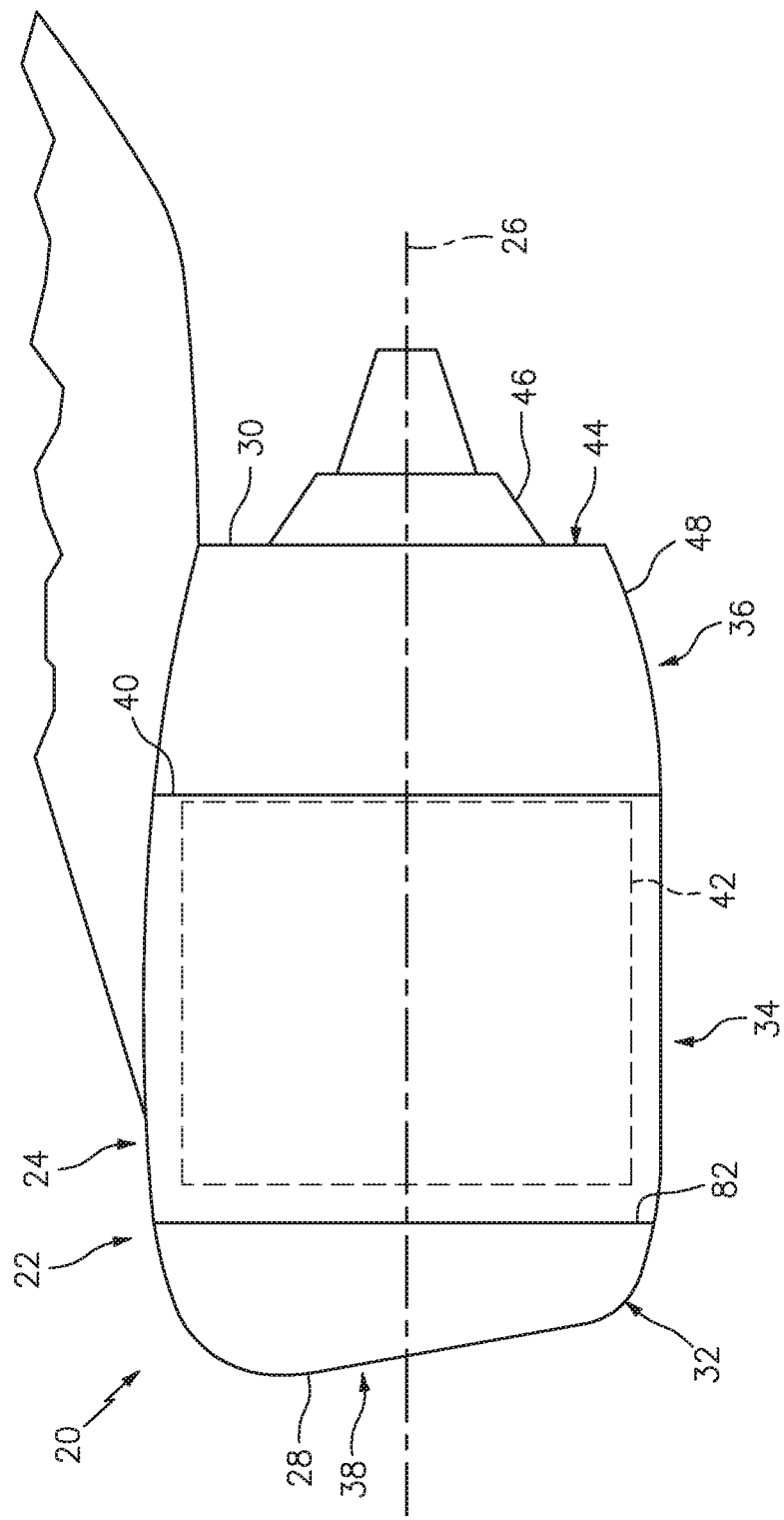
FIG. 1 is a side view illustration of an aircraft propulsion system.

FIG. 1 illustrates an aircraft propulsion system 20 for an aircraft such as, but not limited to, a commercial airliner. The propulsion system 20 includes a nacelle 22 and a gas turbine engine (not visible in FIG. 1). This gas turbine engine may be configured as a high-bypass turbofan engine. Alternatively, the gas turbine engine may be configured as any other type of gas turbine engine capable of propelling the aircraft during flight.

The nacelle 22 is configured to house and provide an aerodynamic cover for the gas turbine engine. The nacelle 22 includes a nacelle outer structure 24 that extends along an axial centerline 26 between a nacelle forward end 28 and a nacelle aft end 30. The nacelle outer structure 24 of FIG. 1 includes a nacelle inlet structure 32, one or more fan cowls 34 (one such cowl visible in FIG. 1) and a nacelle aft structure 36, which may be configured as part of or include a thrust reverser system.

As discussed below in further detail, the inlet structure 32 is disposed at the nacelle forward end 28. The inlet structure 32 is configured to direct a stream of air through an inlet opening 38 (see also FIG. 2) at the nacelle forward end 28 and into a fan section of the gas turbine engine.

The fan cowls 34 are disposed axially between the inlet structure 32 and the aft structure 36. Each fan cowl 34 of FIG. 1, in particular, is disposed at an aft end 40 of a stationary portion of the nacelle 22, and extends forward to the inlet structure 32. Each fan cowl 34 is generally axially aligned with a fan section of the gas turbine engine. The fan cowls 34 are configured to provide an aerodynamic covering for a fan case 42, which circumscribes the fan section and partially forms an outer peripheral boundary of a bypass flowpath of the propulsion system 20.

The term "stationary portion" is used above to describe a portion of the nacelle 22 that is stationary during propulsion system 20 operation (e.g., during takeoff, aircraft flight and landing). However, the stationary portion may be otherwise movable for propulsion system 20 inspection/maintenance; e.g., when the propulsion system 20 is non-operational. Each of the fan cowls 34, for example, may be configured to provide access to components of the gas turbine engine such as the fan case 42 and/or peripheral equipment configured therewith for inspection, maintenance and/or otherwise. In particular, each of fan cowls 34 may be pivotally mounted with the aircraft propulsion system 20 by, for example, a pivoting hinge system. Alternatively, the fan cowls 34 and the inlet structure 32 may be configured into a single translatable body for example. The present disclosure, of course, is not limited to the foregoing fan cowl configurations and/or access schemes.

The aft structure 36 of FIG. 1 is disposed at the nacelle aft end 30. The aft structure 36 is configured to form a bypass nozzle 44 for the bypass flowpath with a nacelle inner structure 46 of the nacelle 22; e.g., an inner fixed structure (IFS). The aft structure 36 may include one or more translating sleeves 48 (one such sleeve visible in FIG. 1) for the thrust reverser system. The present disclosure, however, is not limited to such a translatable sleeve thrust reverser system, or to an aircraft propulsion system 20 with a thrust reverser system.

Figure 2:
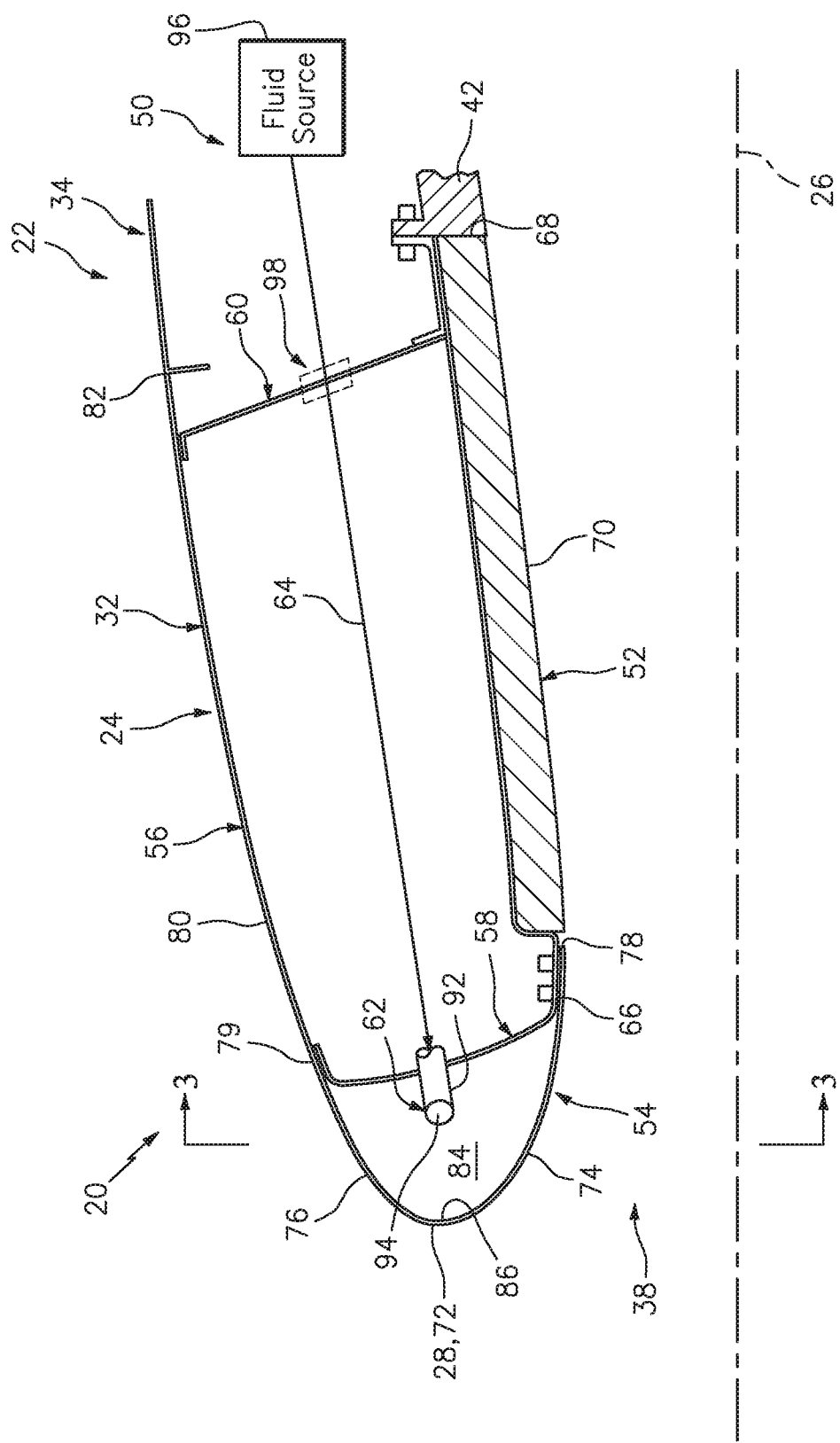
FIG. 2 is a side sectional illustration of a portion of the aircraft propulsion system configured with a thermal anti-icing system.

FIG. 2 is a schematic side sectional illustration of an assembly for the propulsion system 20 of FIG. 1. This propulsion system assembly includes the inlet structure 32, the fan cowls 34 (one shown) and the fan case 42. The propulsion system assembly also includes a thermal anti-icing system 50.

The inlet structure 32 in FIG. 2 includes a tubular inner barrel 52, an annular inlet lip 54, a tubular outer barrel 56 and a plurality of inlet structure bulkheads 58 and 60. The inlet structure 32 is also configured with at least one nozzle 62 and at least one fluid conduit 64 (schematically shown in FIG. 2) of the thermal anti-icing system 50.

The inner barrel 52 extends circumferentially around the axial centerline 26. The inner barrel 52 extends axially along the axial centerline 26 between an inner barrel forward end 66 and an inner barrel aft end 68.

The inner barrel 52 may be configured to attenuate noise generated during propulsion system 20 operation and, more particularly for example, noise generated by rotation of the fan. The inner barrel 52 of FIG. 2, for example, includes at least one tubular acoustic panel 70 or an array of arcuate acoustic panels arranged around the axial centerline 26. Each acoustic panel 70 may include a porous (e.g., honeycomb) core bonded between a perforated face sheet and a non-perforated back sheet, where the perforated face sheet faces radially inward and provides an outer boundary for an axial portion of the gas path. Of course, various other acoustic panel types and configurations are known in the art, and the present disclosure is not limited to any particular ones thereof.

The inlet lip 54 forms a leading edge 72 of the nacelle 22 as well as the inlet opening 38 to the gas path. The inlet lip 54 has a cupped (e.g., generally U-shaped) cross-sectional geometry, which extends circumferentially around the axial centerline 26. The inlet lip 54 includes an inner lip skin 74 and an outer lip skin 76, which skins 74 and 76 may be formed from generally contiguous, metallic material such as, but not limited to, aluminum or titanium.

The inner lip skin 74 extends axially from the outer lip skin 76 at the nacelle forward end 28 to the inner barrel 52. An aft end 78 of the inner lip skin 74 is attached to the forward end 66 of the inner barrel 52 with, for example, one or more fasteners; e.g., rivets, bolts, etc. The inner lip skin 74 may also or alternatively be bonded (e.g., welded, brazed, adhered, etc.) to the inner barrel 52. Of course, the present disclosure is not limited to any particular attachment techniques between the inlet lip 54 and the inner barrel 52.

The outer lip skin 76 extends axially from the inner lip skin 74 at the nacelle forward end 28 to a forward end 79 of the outer barrel 56.

The outer barrel 56 has a tubular outer barrel skin 80 that extends circumferentially around the axial centerline 26. The outer barrel skin 80 extends axially along the axial centerline 26 from the inlet lip 54 and, more particularly, the outer lip skin 76 to an aft end 82 of the outer barrel 56. The outer barrel 56 may be formed from or otherwise include metal such as, but not limited to, aluminum or titanium. Alternatively, the outer barrel 56 may be formed from or otherwise include another a composite material; e.g., fiber-reinforcement within a polymer matrix.

The forward bulkhead 58 is configured with the inlet lip 54 to form a forward (e.g., annular) cavity 84 within the inlet lip 54. The forward bulkhead 58 of FIG. 2, in particular, is axially located approximately at (e.g., proximate, adjacent or on) the ends 78 and 79. The forward bulkhead 58 may be configured as a substantially annular body, which may be continuous or circumferentially segmented. The forward bulkhead 58 is attached to and extends radially between the inner lip skin 74 and the outer lip skin 76. The forward bulkhead 58 may be mechanically fastened to the inlet lip 54 with one or more fasteners. The forward bulkhead 58 may also or alternatively be bonded and/or otherwise connected to the inlet lip 54. The forward bulkhead 58 may be formed from or otherwise include metal such as, but not limited to, aluminum or titanium.

Figure 3:
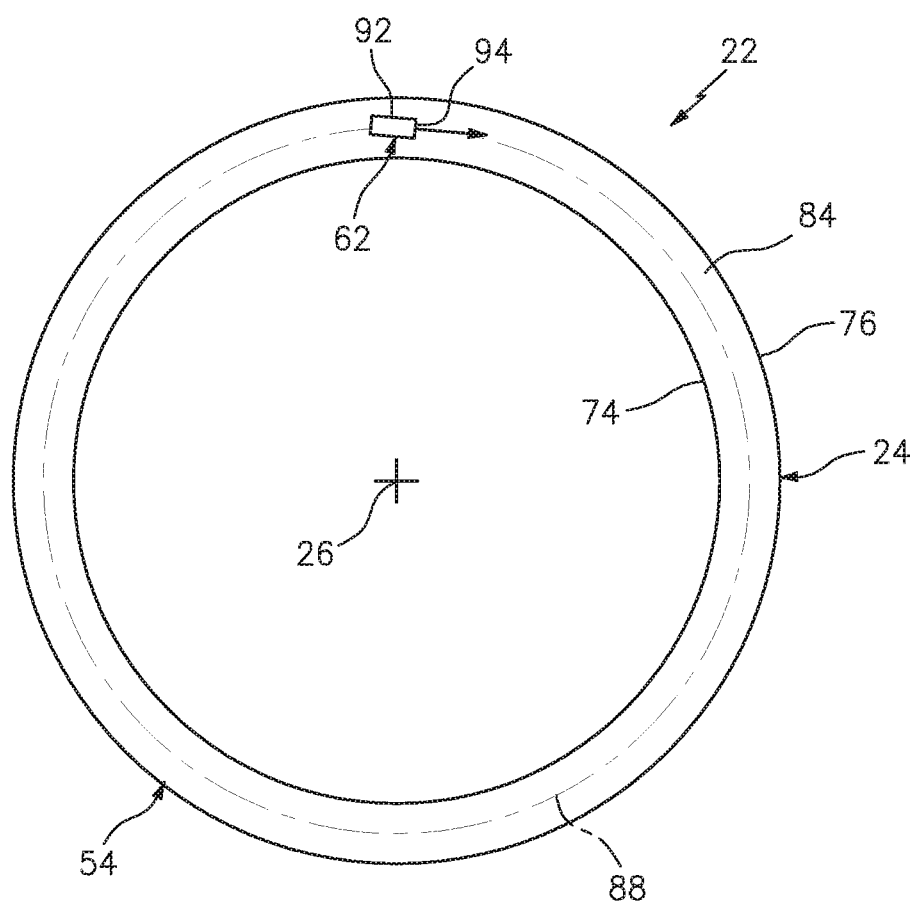
FIG. 3 is a cross-sectional illustration of an inlet structure of a nacelle for the aircraft propulsion system taken along line 3-3 in FIG. 2.

The cavity 84 extends axially within the inlet lip 54 from a forward end 86 of the inlet lip 54 to the forward bulkhead 58. The cavity 84 extends radially within the inlet lip 54 from the inner lip skin 74 to the outer lip skin 76. Referring to FIG. 3, the cavity 84 also extends longitudinally (e.g., circumferentially) along a curvilinear longitudinal centerline 88 of the cavity 84 within the inlet lip 54, which curvilinear centerline 88 extends circumferentially about the axial centerline 26.

Referring again to FIG. 2, the aft bulkhead 60 may be configured to provide a firewall/heat shield between the inlet structure 32 and the remainder of the nacelle 22. The aft bulkhead 60 of FIG. 2, for example, is located at (e.g., on, adjacent or proximate) the aft ends 68 and 82. The aft bulkhead 60 may be configured as a substantially annular body, which may be continuous or circumferentially segmented. The aft bulkhead 60 is attached to and extends radially between the inner barrel 52 and the outer barrel 56. The aft bulkhead 60 may be mechanically fastened to the inner barrel 52 and/or the outer barrel 56 with one or more fasteners (not visible in FIG. 2). The aft bulkhead 60 may also or alternatively be bonded and/or otherwise connected to the inner barrel 52 and/or the outer barrel 56. The aft bulkhead 60 may be formed from or otherwise include metal such as, but not limited to, aluminum or titanium.

The nozzle 62 is configured to inject fluid (e.g., heated air), which is received from the thermal anti-icing system 50 through the fluid conduit 64, approximately longitudinally into the cavity 84. For example, the nozzle 62 can direct the fluid into the cavity 84 approximately tangentially to the centerline 88.

The nozzle 62 of FIGS. 2 and 3 includes a nozzle base 92 and a nozzle tip 94. The nozzle base 92 is configured with the forward bulkhead 58. In particular, the nozzle base 92 is connected to and projects axially from the forward bulkhead 58 to the nozzle tip 94. The nozzle tip 94 projects out and is cantilevered from the nozzle base 92 in a lateral direction to a distal end outlet where the fluid is directed longitudinally out from the nozzle 62 and into the cavity 84. The present disclosure, of course, is not limited to the foregoing nozzle configuration. Furthermore, the present disclosure is not limited to a thermal anti-icing system with a single nozzle. For example, one or more additional nozzles may be positioned at respective circumferential and/or radial positions about the forward bulkhead 58.

The fluid conduit 64 fluidly couples a fluid source 96 (e.g., a compressor bleed of the gas turbine engine) for the thermal anti-icing system 50 with the nozzle 62. To provide such a fluid coupling, the fluid conduit 64 extends through various support structures including the forward bulkhead 58 and the aft bulkhead 60. In order to maintain integrity of the firewall/heat shield functionality of the aft bulkhead 60, a seal assembly 98 is provided at an intersection between the fluid conduit 64 and the aft bulkhead 60. A portion of the fluid conduit 64 between the bulkheads 58 and 60 may also be configured with a double wall as described below in further detail.

During operation of the thermal anti-icing system 50, fluid (e.g., heated air) is directed from the fluid source 96 through the fluid conduit 64 to the nozzle 62. The fluid is then approximately longitudinally injected into the cavity 84 by the nozzle 62 in order to heat the material of the inlet lip 54 in order to prevent or mitigate formation of ice on the inlet structure 32 and, more particularly, the inlet lip 54.

The fluid received from the fluid source 96 and directed through the fluid conduit 64 may reach relatively high temperatures. Exposure to such high temperatures may cause degradation and/or failure of polymer seal materials such as, but not limited to, silicon. Known seal assemblies with polymer seal elements therefore may not be suitable for sealing the intersection between the fluid conduit 64 and the aft bulkhead 60. However, a polymer seal element may be less expensive than and/or may provide improved sealing characteristics relative to a metal seal element. The seal assembly 98 of the present disclosure therefore is configured, as described below, to accommodate relatively high temperatures while still enabling use of, for example, a polymer seal element.

Figure 4:
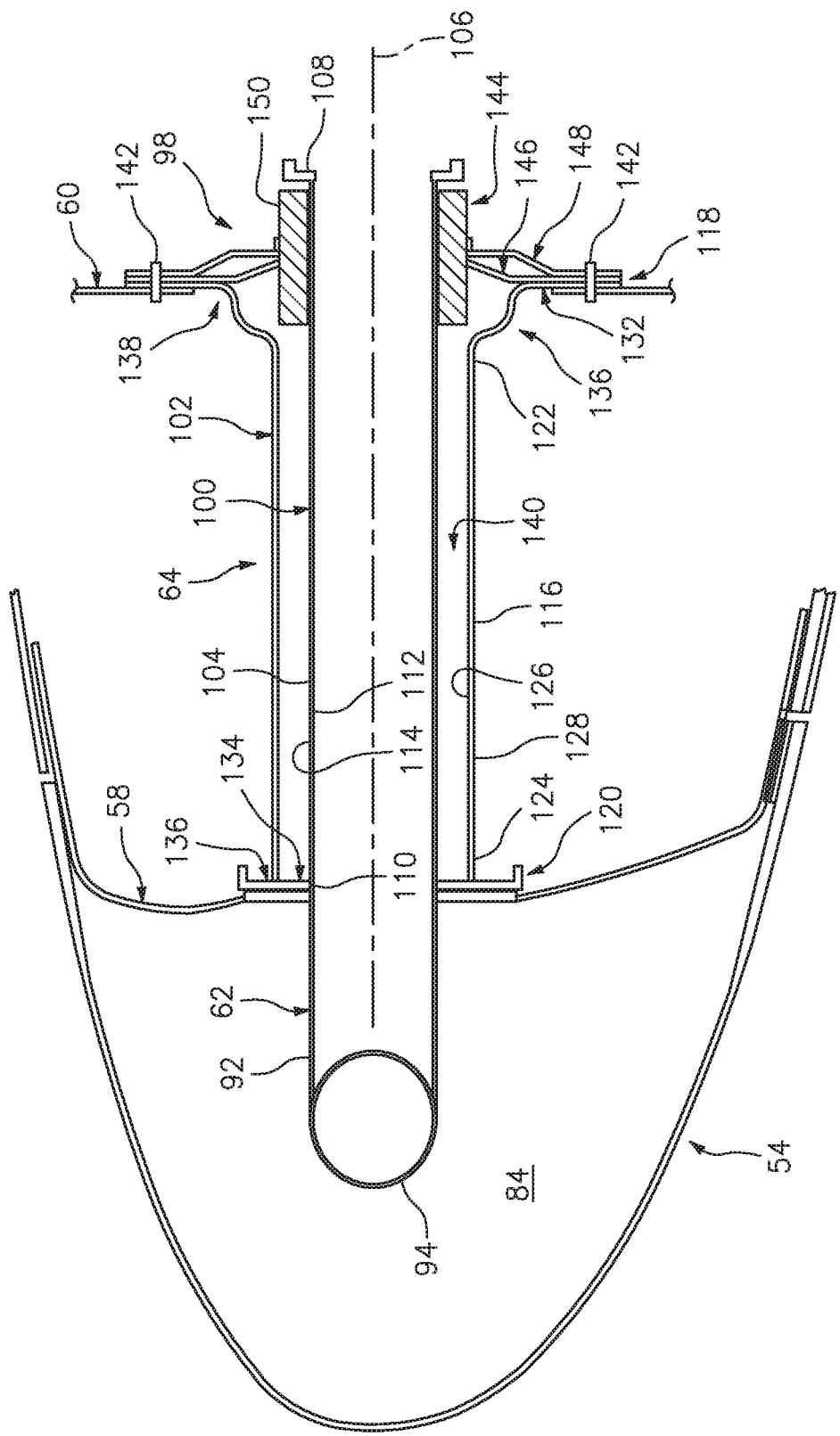
FIG. 4 is a side sectional illustration of a portion of the inlet structure configured with a section of conduit and a nozzle of the thermal anti-icing system.

FIG. 4 illustrates an interface between the fluid conduit 64 and the bulkheads 58 and 60. A section of the fluid conduit 64 shown in FIG. 4 is configured with a double wall construction. In particular, the fluid conduit 64 includes a tubular inner structure 100 (e.g., an inner conduit segment) and a tubular outer structure 102 (e.g., an outer conduit segment).

The inner structure 100 is configured with a tubular sidewall 104. This inner structure tubular sidewall 104 extends axial along an axial conduit centerline 106 between an upstream inner structure end 108 and a downstream inner structure end 110. The upstream inner structure end 108 is fluidly coupled with the fluid source 96 (see FIG. 2) through at least another section of the fluid conduit 64. The downstream inner structure end 110 is fluidly coupled with the nozzle 62 and its nozzle base 92. The inner structure tubular sidewall 104 of FIG. 4, for example, may be formed integral with the nozzle 62 and its base 92 as a single tubular structure. Of course, in other embodiments, the nozzle base 92 may be otherwise connected (directly or indirectly) to the downstream inner structure end 110; e.g., via a mechanical joint, a braze joint or a weld joint.

The inner structure tubular sidewall 104 extends radially, relative to the conduit centerline 106, between an interior inner structure surface 112 and an exterior inner structure surface 114. The interior inner structure 112 surface and/or the exterior inner structure surface 114 may each be a tubular surface; e.g., a cylindrical surface.

The inner structure 100 may be constructed from or otherwise include a metal material.

The outer structure 102 is configured with a tubular sidewall 116 and one or more (e.g., annular) flanges 118 and 120. The outer structure tubular sidewall 116 extends axial along the conduit centerline 106 between an upstream outer structure end 122 and a downstream outer structure end 124. The outer structure tubular sidewall 116 extends radially, relative to the conduit centerline 106, between an interior outer structure surface 126 and an exterior outer structure surface 128. The interior outer structure surface 126 and/or the exterior outer structure surface 128 may each be a tubular surface; e.g., a cylindrical surface.

The upstream flange 118 is connected to the outer structure tubular sidewall 116 at the upstream outer structure end 122. For example, the upstream flange 118 projects at least radially, relative to the conduit centerline 106, out from the outer structure tubular sidewall 116 at the upstream outer structure end 122 to a distal outer edge. In the embodiments of FIG. 4, an (e.g., annular) inner portion 130 of the upstream flange 118 also projects axially along the conduit centerline 106 away from the upstream outer structure end 122 to an (e.g., annular) outer portion 132 of the upstream flange 118. The upstream flange 118 as well as its inner and its outer portions 130 and 132 extend circumferentially about (e.g., complete around) the outer structure tubular sidewall 116 and the conduit centerline 106.

The downstream flange 120 is connected to the outer structure tubular sidewall 116 at the downstream outer structure end 124. For example, an (e.g., annular) inner portion 134 of the downstream flange 120 projects at least radially, relative to the conduit centerline 106, in from the outer structure tubular sidewall 116 at the downstream outer structure end 124 to a distal inner edge. An (e.g., annular) outer portion 136 of the downstream flange 120 projects at least radially, relative to the conduit centerline 106, out from the outer structure tubular sidewall 116 at the downstream outer structure end 124 to a distal outer edge. The downstream flange 120 thereby extends radially between its distal inner and its distal outer edges. Of course, in other embodiments, the inner portion 134 or the outer portion 136 of the downstream flange 120 may be omitted.

In some embodiments, the distal outer edge of the downstream flange 120 may have a radius sized less than a radius of the distal outer edge of the upstream flange 118. The downstream flange 120 may thereby be passed through an opening 138 in the aft bulkhead 60 during installation.

The outer structure 102 is configured to provide an enclosure around the inner structure 100 in case of inner structure 100 burst. The outer structure 102 is also or alternatively configured to form an insulating cavity 140 (e.g., annulus) around the inner structure 100. This cavity 140 extends radially, relative to the conduit centerline 106, between the exterior inner structure surface 104 and the interior outer structure surface 126. The cavity 140 extends axially along the conduit centerline 106 from the downstream flange 120 to the seal assembly 98. The inner structure 100 thereby is located within the cavity 140. More particularly, the inner structure 100 extends axially within/projects axially through a bore of the outer structure 102.

The upstream flange 118 is mounted to the aft bulkhead 60. The outer portion 132 of the upstream flange 118, for example, may be mechanically attached to the aft bulkhead 60 by one or more fasteners 142; e.g., bolts or rivets.

The downstream flange 120 may be mounted to the forward bulkhead 58. The outer portion 134 and/or the inner portion 136 of the downstream flange 120, for example, may be mechanically attached and/or bonded to the forward bulkhead 58. Alternatively, the downstream flange 120 may axially abut against (or be positioned axially next to) the forward bulkhead 58 without a connection therebetween to allow axial movement therebetween.

The inner portion 134 of the downstream flange 120 circumscribes and may radially engage (e.g., contact) the inner structure tubular sidewall 104. The downstream flange 120 may thereby locate the downstream outer structure end 124 radially relative to the downstream inner structure end 110.

The seal assembly 98 is configured to close off an end of the insulating cavity 140 between the inner structure 100 and the outer structure 102. The seal assembly 98, for example, is configured to substantially seal/plug a (e.g., annular) gap extending radially between and defined by the inner structure 100 and the outer structure 102.

The seal assembly 98 of FIG. 4 includes a seal land 144 and one or more seal elements 146 and 148. The seal land 144 is configured to provide a restrictive (e.g., limited) heat conduction path from the inner structure 100 to an outer surface 150 of the seal land 144. With such a configuration, a temperature of the seal land material at the outer surface 150 may be (e.g., at least 2-10 times) less than a temperature of the seal land material engaged with (e.g., contacting) the inner structure 100 during thermal anti-icing system 50 operation (see FIG. 2). The present disclosure, however, is not limited to such an exemplary temperature drop.

Figure 5:
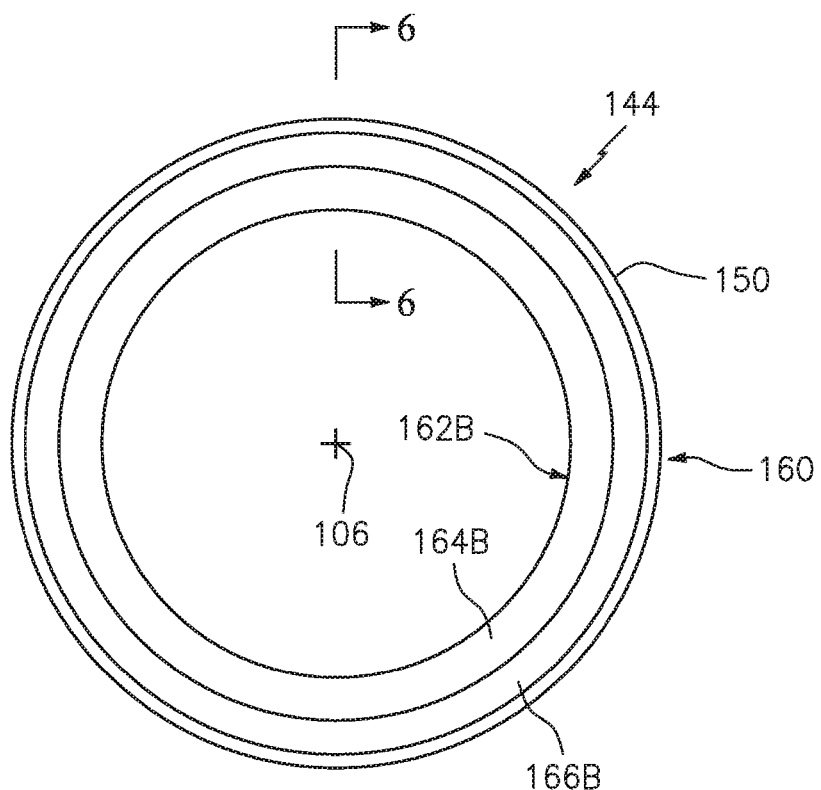
FIG. 5 is an end view illustration of a seal land.
Figure 6:
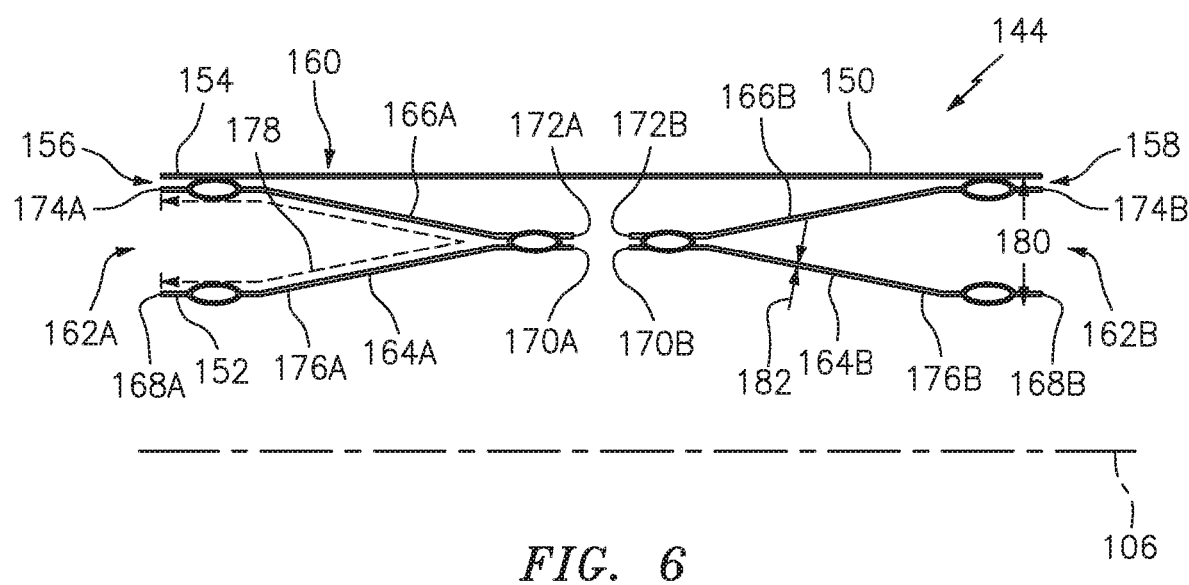
FIG. 6 is a side sectional illustration of a portion of the seal land taken along line 6-6 in FIG. 5.

The seal land 144 may be configured as a full hoop body. The seal land 144 of FIG. 5, for example, extends circumferentially about (e.g., completely around) the conduit centerline 106. Referring to FIG. 4, the seal land 144 may thereby circumscribe the inner structure 100 and its tubular sidewall 104. Referring to FIG. 6, the seal land 144 extends radially, relative to the conduit centerline 106, between an inner seal land side 152 and an exterior seal land side 154. The seal land 144 extends axially along the conduit centerline 106 between opposing seal land ends 156 and 158.

The seal land 144 of FIG. 6 includes a seal land tube 160 (e.g., a landing) and one or more seal land mounts 162A and 162B (generally referred to as "162"). The seal land tube 160 extends axially along the conduit centerline 106 between the seal land ends 156 and 158. The seal land tube 160 extends radially out to and thereby forms/carries the outer surface 150. Referring to FIG. 5, the seal land tube 160 extends circumferentially about (e.g., completely around) the conduit centerline 106. The outer surface 150 may be a tubular surface; e.g., a cylindrical surface.

Each of the seal land mounts 162 extends circumferentially about (e.g., completely around) the conduit centerline 106. Referring to FIG. 6, each of the seal land mounts 162 is configured to mount (e.g., connect) the seal land tube 160 to the inner structure 100 (see FIG. 4). Each seal land mount 162 of FIG. 6, for example, includes an (e.g., annular) inner conical element 164A, 164B (generally referred to as "164") and an (e.g., annular) outer conical element 166A, 166B (generally referred to as "166"). Each of the conical elements 164, 166 extends circumferentially about (e.g., completely around) the conduit centerline 106 as shown in FIG. 5.

Referring to FIG. 6, each inner conical element 164 extends diagonally (e.g., radially and axially in a first direction) between an inner end 168A, 168B (generally referred to as "168") and an outer end 170A, 170B (generally referred to as "170"). Each outer conical element 166 extends radially and axially diagonally (e.g., radially and axially in a second direction) between an inner end 172A, 172B (generally referred to as "172") and an outer end 174A, 174B (generally referred to as "174"), where the second direction is opposite the first direction of the inner conical element 164 in the same seal land mount 162. The inner end 168 of each inner conical element 164 is connected (e.g., welded or otherwise attached) to the inner structure 100 and its tubular sidewall 104 (see FIG. 4). The outer end 170 of each inner conical element 164 is connected (e.g., welded or otherwise attached) to the outer conical element 166 and its inner end 172. The outer end 174 of each outer conical element 166 is connected (e.g., welded or otherwise attached) to the seal land tube 160 at, for example, a respective end 156, 158. Each seal land mount 162 may thereby extend along an extended (e.g., tortuous) path 176A, 176B (generally referred to as "176") from the inner structure 100 to the seal land tube 160. This extended path 176 may have a length 178 that is greater than a shortest (e.g., minimum radial) distance 180 between the inner structure 100 (see FIG. 4) and the seal land tube 160 and/or the outer surface 150. For example, the length 178 of the extended path 176 may be at least two times (e.g., at least 4-6 times) greater than the distance 180. The present disclosure, however, is not limited to such an exemplary spatial relationship. In the specific embodiment of FIG. 6, the extended path 176 provides each seal land mount 162 with a v-shaped sectional geometry when viewed, for example, in a plane parallel to the conduit centerline 106; e.g., the plane of FIG. 6.

In the embodiment of FIG. 6, the seal land mounts 162A and 162B have mirror image configurations. However, in other embodiments, the seal land mounts 162A and 162B may alternatively have a common orientation and/or different configurations. For example, in some embodiments, longitudinal lengths of the elements 164A and 166A may be respectively equal to longitudinal length of the elements 164B and 166B, where the term "longitudinal length" may describe an end-to-end length in the axial-radial plane of FIG. 6. However, in other embodiments, the longitudinal length(s) of the elements 164A and/or 166A may be respectively greater than or less than the longitudinal length(s) of the elements 164B and/or 166B.

In order to further reduce conduction through the seal land mounts 162, each mount 162 may be configured with a material thickness 182 that is significantly less than the length 178 of the extended path 176. For example, the material thickness 182 (e.g., measured perpendicular to the path) may be at least 10, 20, 30 or more times less than the length 178 of the extended path 176. The present disclosure, however, is not limited to such an exemplary spatial relationship.

The seal land 144 may be constructed from or otherwise include a metal material.

Figure 7:
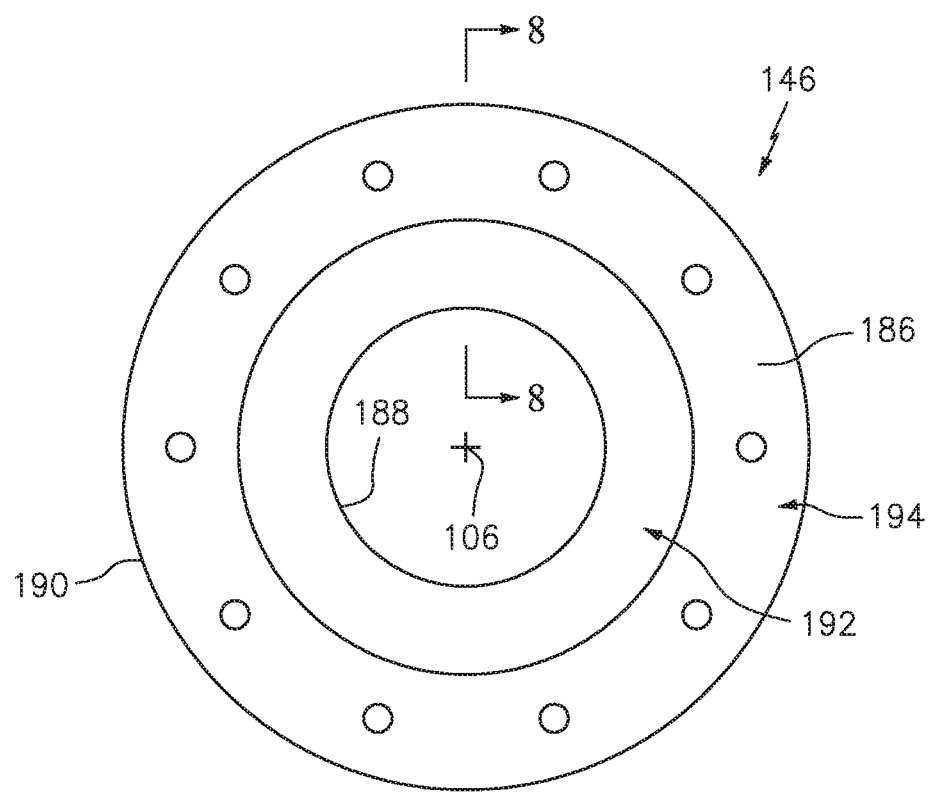
FIG. 7 is an end view illustration of a first seal element.
Figure 8:
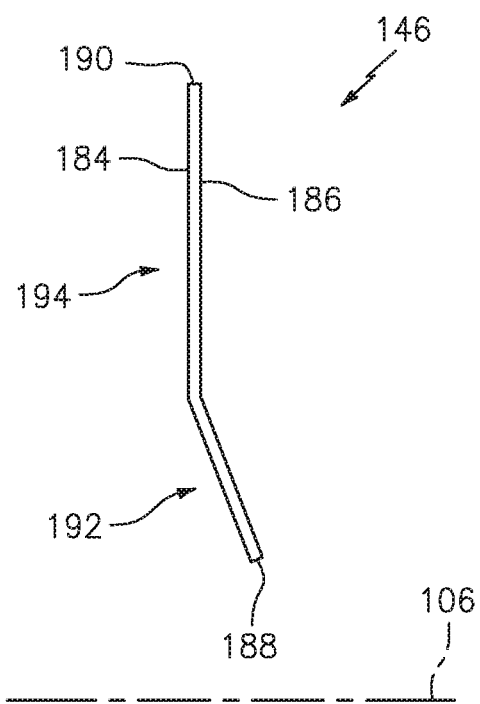
FIG. 8 is a side sectional illustration of a portion of the first seal element taken along line 8-8 in FIG. 7.

Referring to FIGS. 7 and 8, the first seal element 146 may be configured as a full hoop body. The first seal element 146 of FIG. 7, for example, extends circumferentially about (e.g., completely around) the conduit centerline 106.

Referring to FIG. 8, the first seal element 146 extends axially along the conduit centerline 106 between opposing (e.g., annular) first seal element side surfaces 184 and 186. Each of these side surfaces 184 and 186 may be a substantially (e.g., circumferentially and/or radially) uninterrupted surface. The term "uninterrupted" is used herein to describe a surface without any surface interruptions such as, for example, apertures (e.g., holes, grooves, etc.) breaking the plane of/piercing the surface. Of course, these otherwise uninterrupted surfaces 184 and 186 may be pierced by one or more fastener apertures for attaching the first seal element 146 to the aft bulkhead 60 (e.g., see FIG. 4). However, in other embodiments, one or more of the side surfaces may alternatively include one or more interruptions. For example, each side surface 184, 186 may include a split (e.g., joint) line where the first seal element 146 is formed from an array of arcuate segments.

The first seal element 146 extends radially, relative to the conduit centerline 106, between an inner first seal element edge 188 and an outer first seal element edge 190.

The first seal element 146 of FIGS. 7 and 8 is configured with an (e.g., annular) inner portion 192 and an (e.g., annular) outer portion 194. The inner portion 192 extends diagonally (e.g., radially and axially) from the inner first seal element edge 188 to an intersection between the inner and the outer portions 192 and 194. The inner portion 192 may thereby have a conical geometry. The outer portion 194 extends radially from the intersection between the inner and the outer portions 192 and 194 to the outer first seal element edge 190. The outer portion 194 may thereby have a planar geometry.

Figure 8B:
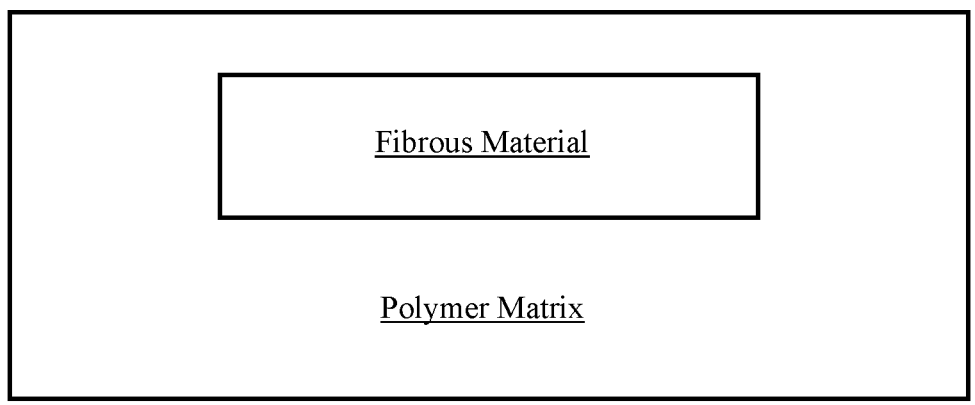
FIG. 8B is a schematic illustration of fibrous material embedded within a polymer matrix.

The first seal element 146 may be constructed from or otherwise include a polymer material. For example, the first seal element 146 may include fibrous material/fiber reinforcement embedded within a polymer matrix; e.g., see FIG. 8B. An example of the fibrous material is, but is not limited to, Nextel™ fabric material produced by 3M Company headquartered in MN, USA. The polymer matrix may be a thermoset polymer or a thermoplastic polymer. An example of the polymer material is, but is not limited to, silicon (Si) polymer material.

Figure 9:
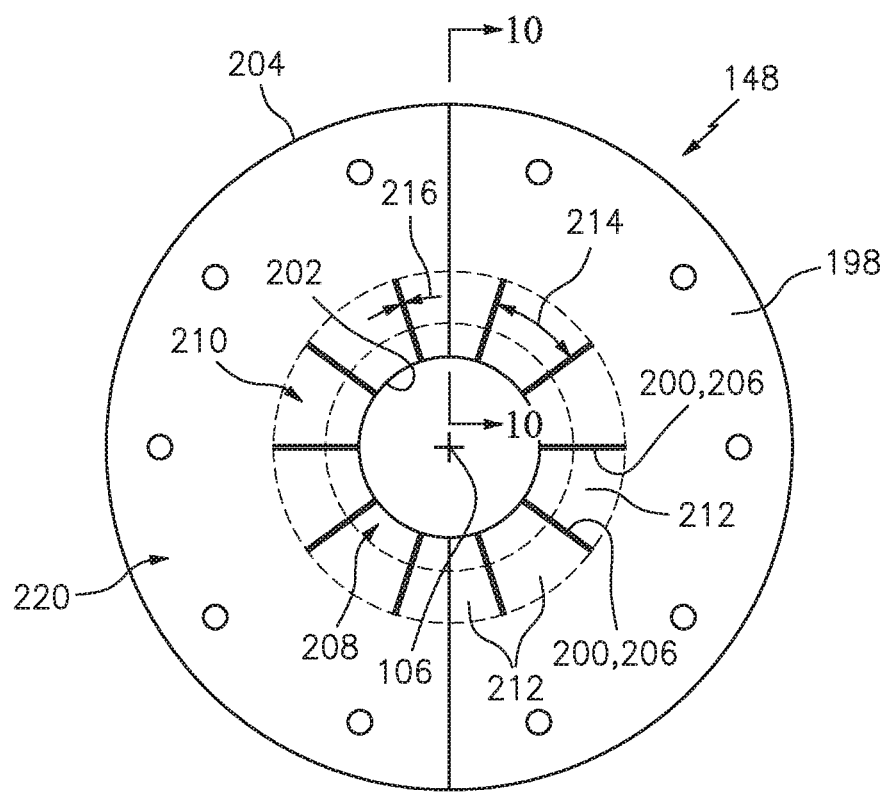
FIG. 9 is an end view illustration of a second seal element.
Figure 10:
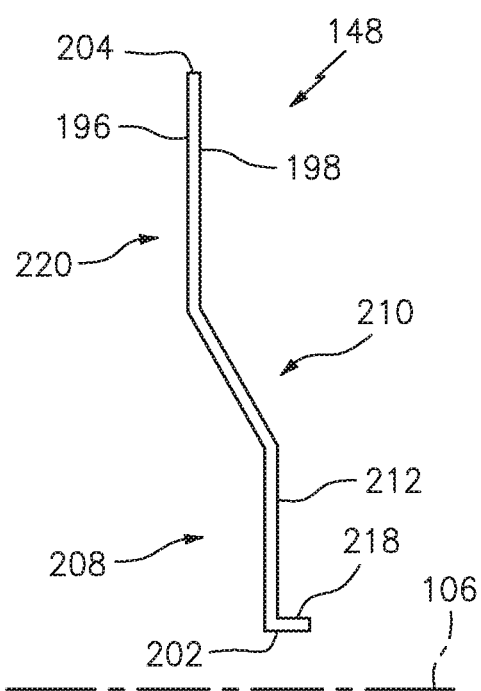
FIG. 10 is a side sectional illustration of a portion of the second seal element taken along line 10-10 in FIG. 9.

Referring to FIGS. 9 and 10, the second seal element 148 may be configured as a full hoop body. The second seal element 148 of FIG. 9, for example, extends circumferentially about (e.g., completely around) the conduit centerline 106. The second seal element 148 may be circumferentially segmented (e.g., formed from 2 or more arcuate segments), or circumferentially unsegmented.

Referring to FIG. 10, the second seal element 148 extends axially along the conduit centerline 106 between opposing (e.g., annular) second seal element side surfaces 196 and 198. At least a portion of each of these side surfaces 196 and 198 may be circumferentially interrupted by one or more surface interruptions 200 (see FIG. 9) as described below in further detail.

The second seal element 148 extends radially, relative to the conduit centerline 106, between an inner second seal element edge 202 and an outer second seal element edge 204.

The second seal element 148 of FIG. 9 may be configured as a (e.g., annular) turkey feather seal. The second seal element 148 of FIG. 9, for example, is configured with one or more cuts 206 (e.g., radial slits/surface interruptions) arranged circumferentially about the conduit centerline 106. Each of these cuts 206 extends axially through the second seal element 148 between the side surfaces 196 and 198 (see FIG. 10). Each of these cuts 206 extends radially into the second seal element 148 from the inner second seal element edge 202. An (e.g., annular) inner portion 208 and an (e.g., annular) intermediate portion 210 of the second seal element 148 are thereby configured with an array of circumferentially seal fingers 212.

Each of the seal fingers 212 is circumferentially between and adjacent (e.g., directly next to) a pair of circumferentially neighboring seal fingers 212. In the specific embodiment of FIG. 9, a lateral (e.g., circumferential or tangential) width 214 of each seal finger 212 is significantly greater than a lateral (e.g., circumferential or tangential) width 216 of each respective bordering cut 206. For example, the lateral width 214 may be at least 5, 10, 15, 20 or more times greater than the lateral width 216. The present disclosure, however, is not limited to such an exemplary spatial relationship.

The inner portion 208 of FIG. 10 extends radially from the inner second seal element edge 202 to an intersection between the inner portion 208 and the intermediate portion 210. The inner portion 208 may thereby have a planar geometry; however, the inner portion 208 may also include a (e.g., annular) rim 218 at the edge 202. The intermediate portion 210 extends diagonally (e.g., radially and axially) from the intersection between the inner portion 208 and the intermediate portion 210 to an intersection between the intermediate portion 210 and an (e.g., annular) outer portion 220 of the second seal element 148. The intermediate portion 210 may thereby have a conical geometry. The outer portion 220 extends radially from the intersection between the intermediate and the outer portions 210 and 220 to the outer second seal element edge 204. The outer portion 220 may thereby have a planar geometry.

The second seal element 148 may be constructed from or otherwise include a non-polymer material. For example, the second seal element 148 be configured from a (e.g., fireproof) metal material.

Figure 11:
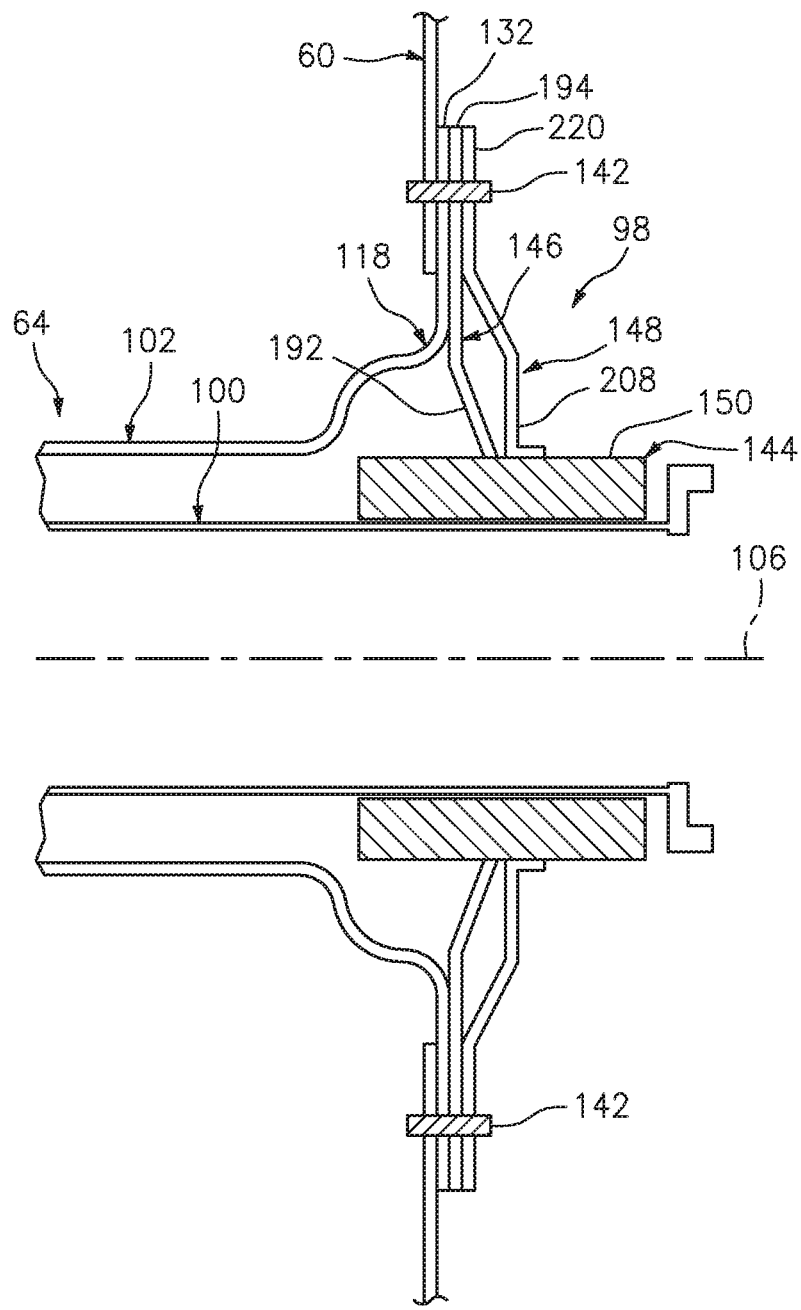
FIG. 11 is a side sectional illustration of a seal assembly for sealing a gap between a tubular inner structure and a tubular outer structure.

Referring to FIG. 11, the first and the second seal elements 146 and 148 are each mounted to the outer structure 102 and/or the aft bulkhead 60. The first and the second seal elements 146 and 148 of FIG. 11, for example, are each mounted to the outer structure 102 and the aft bulkhead 60 by the one or more fasteners 142. In the specific embodiments of FIG. 11, the outer portion 194 of the first seal element 146 is arranged axially between (e.g., sandwiched/clamped between) and contacts the outer portion 220 of the second seal element 148 and the outer portion 132 of the upstream flange 118. The outer portion 132 of the upstream flange 118 is arranged axially between (e.g., sandwiched/clamped between) and contacts the outer portion 194 of the first seal element 146 and the aft bulkhead 60. Each of the one or more fasteners 142 projects sequentially through the components 60, 118, 146 and 148, thereby securing those components 60, 118, 146 and 148 together in an axial stack.

The first and the second seal elements 146 and 148 may each engage the seal land 144. The inner portion 192 of the first seal element 146, for example, circumscribes and sealingly engages (e.g., radially contacts) the outer surface 150. The inner portion 208 of the second seal element 148 similarly circumscribes and sealingly engages (e.g., radially contacts) the outer surface 150. Each of the seal elements 146 and 148 thereby functions to seal the gap between the inner and the outer structures 100 and 102 as well as between the aft bulkhead 60 and the conduit 64. The second seal element 148 also provides a flexible/compliant support for the upstream end of the inner structure 100. The inner structure 100 may thereby shift slightly relative to the aft bulkhead 60 and/or the outer structure 102 during propulsion system 20 operation. In addition, the second seal element 148 may also function as a heat sink and draw thermal energy out of the seal land 144, thereby further lowering the temperature at the outer surface 150.

Figure 12:
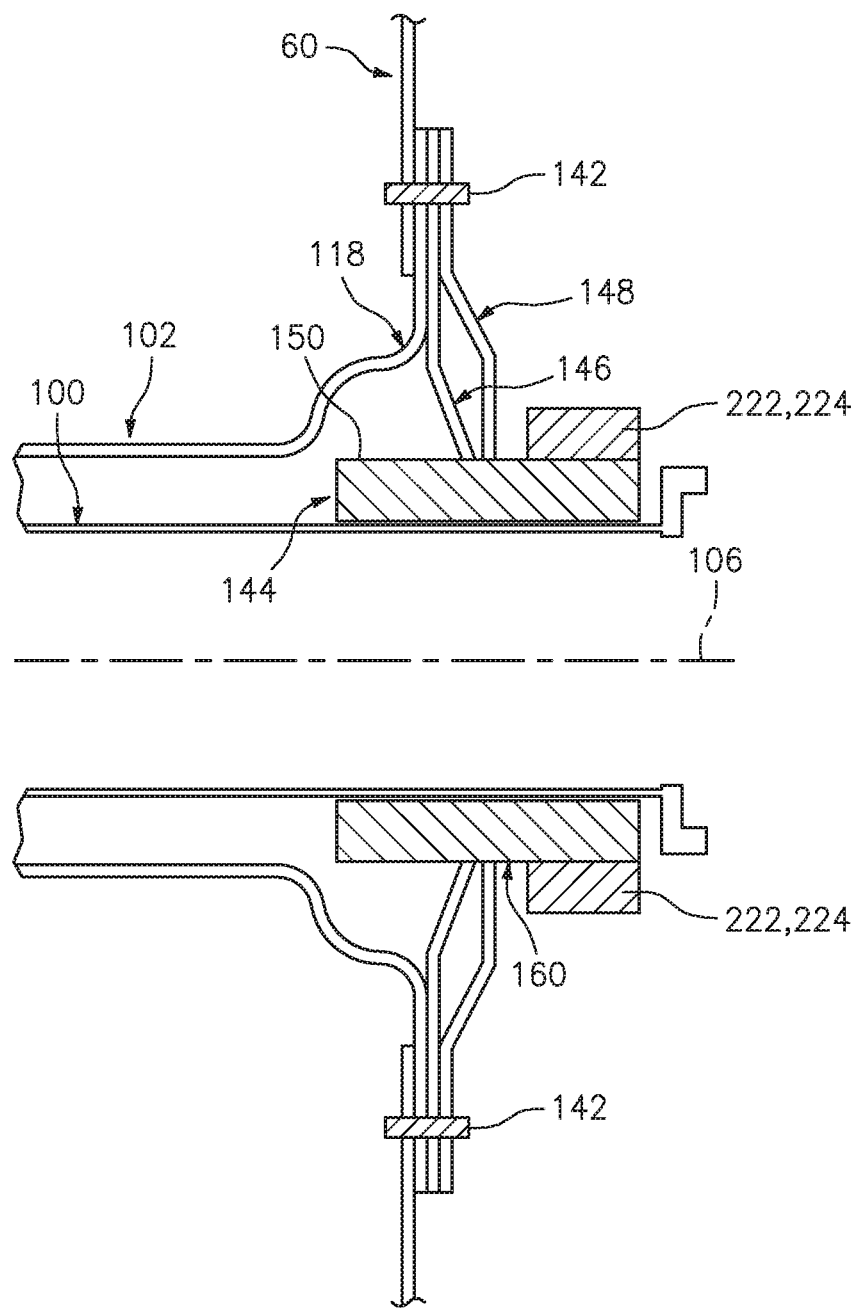
FIG. 12 is a side sectional illustration of another seal assembly for sealing the gap between the tubular inner structure and the tubular outer structure.
Figure 13:
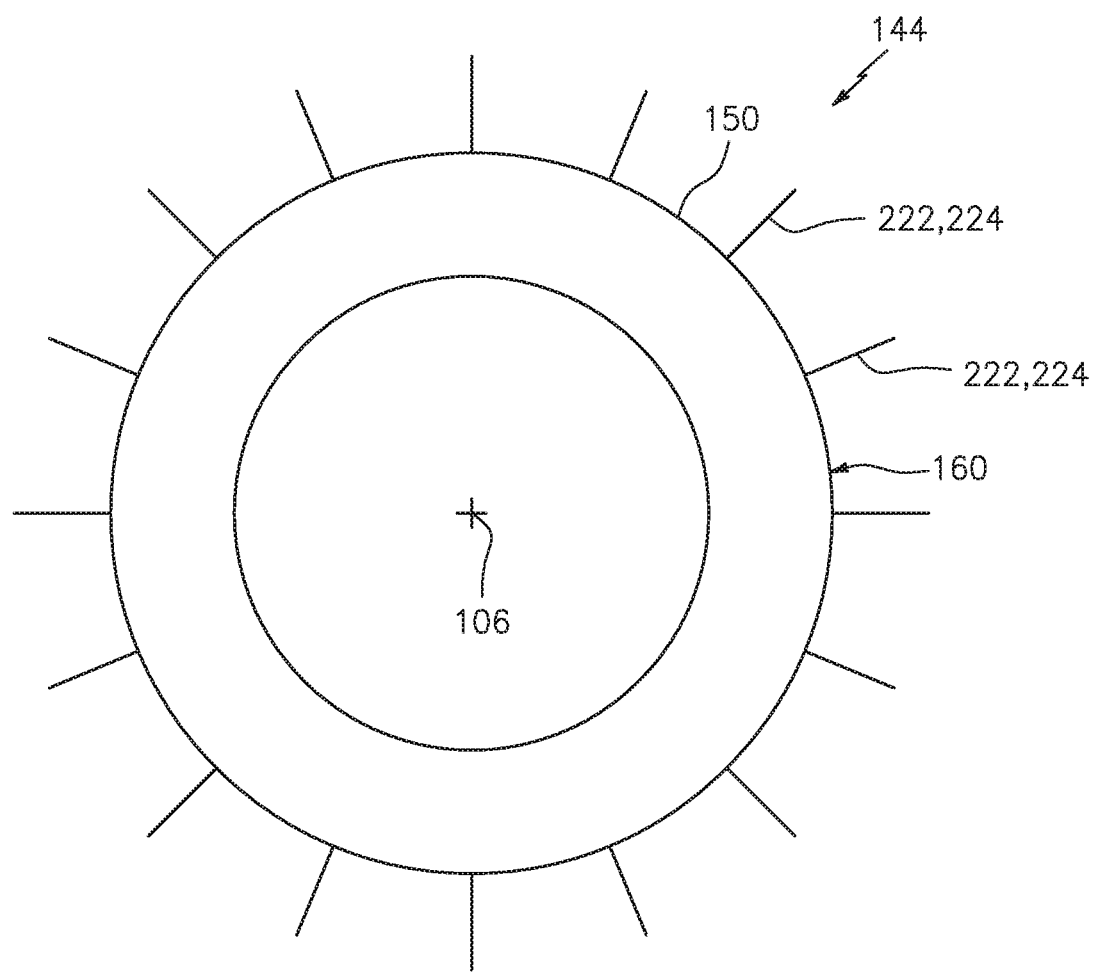
FIG. 13 is an end view illustration of another seal land configured with one or more cooling elements.

In some embodiments, referring to FIGS. 12 and 13, the seal land 144 may include one or more cooling elements 222. The seal land 144 of FIGS. 12 and 13, for example, includes a plurality of cooling fins/vanes 224 arranged circumferentially around the seal land tube 160 (schematically shown) and its outer surface 150 in an annular array. Each of these cooling fins 224 projects at least radially outer from the outer surface 150 to a distal outer fin end.

Figure 14:
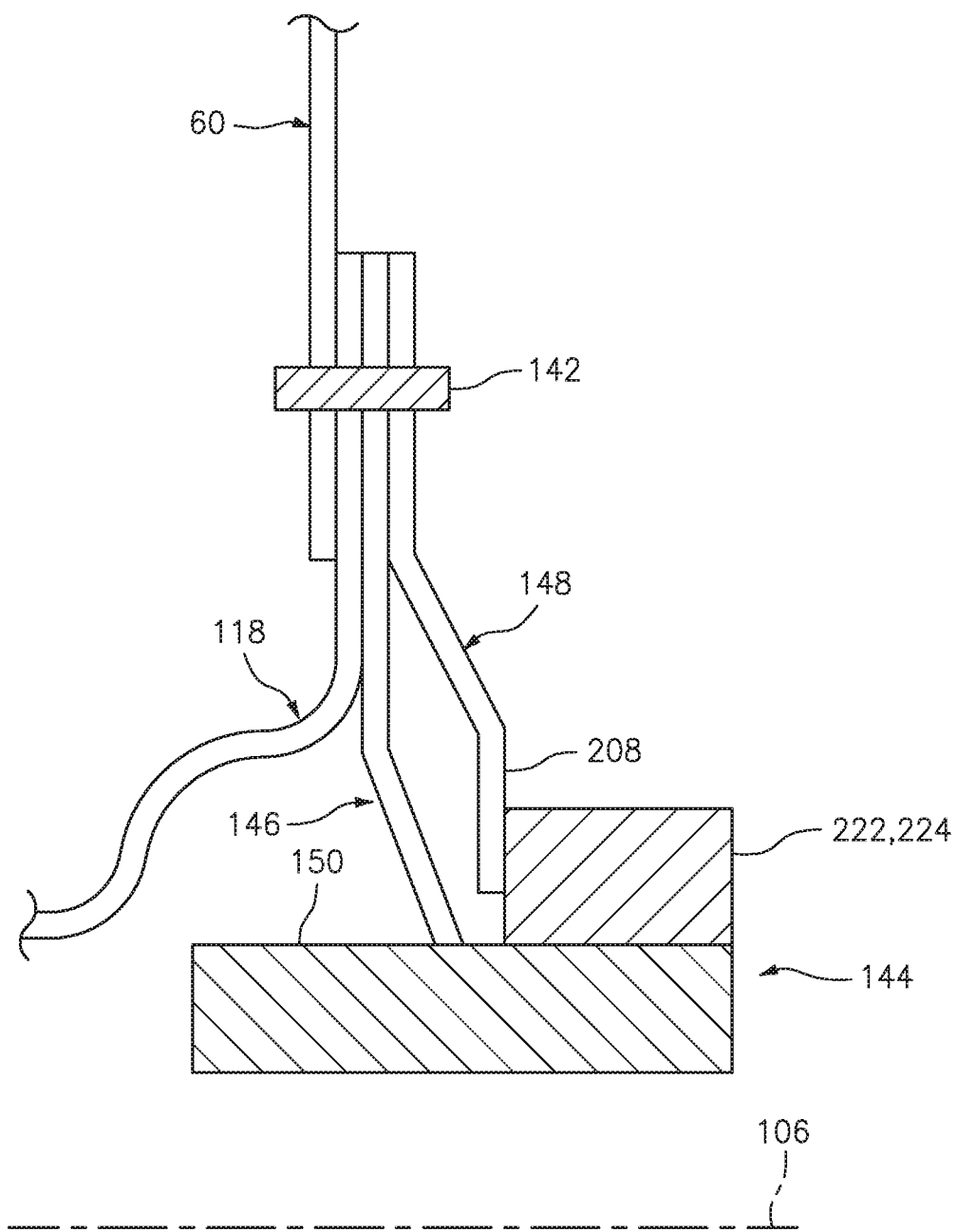
FIG. 14 is a partial side sectional illustration of still another seal assembly for sealing the gap between the tubular inner structure and the tubular outer structure.

In some embodiments, referring to FIG. 14, the second seal element 148 may also or alternatively engage one or more or each of the cooling elements 222. The inner portion 208, for example, may engage (e.g., axially contact) axial ends of one or more or each of the cooling elements 222.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A system for a nacelle of an aircraft propulsion system, comprising:
   a tubular outer structure;
   a tubular inner structure projecting through a bore of the tubular outer structure; and
   a seal assembly configured to close an end of an annulus between the tubular outer structure and the tubular inner structure, the seal assembly including a seal land and a seal element;
   the seal land comprising a seal land mount that circumscribes and is attached to the tubular inner structure, the seal land mount configured with a v-shaped sectional geometry, and the seal land further including an annular array of cooling elements; and the seal element attached to the tubular outer structure, the seal element circumscribing and sealingly engaged with the seal land, and the seal element comprising a polymer material.

2. A system for a nacelle of an aircraft propulsion system, comprising:

a tubular outer structure;

an anti-icing system for an inlet structure of the nacelle, the anti-icing system comprising a tubular inner structure that projects through a bore of the tubular outer structure; and a seal assembly configured to close an end of an annulus between the tubular outer structure and the tubular inner structure, the seal assembly including a seal land and a seal element;

the seal land comprising a seal land mount that circumscribes and is attached to the tubular inner structure, the seal land mount configured with a v-shaped sectional geometry; and the seal element attached to the tubular outer structure, the seal element circumscribing and sealingly engaged with the seal land, and the seal element comprising a polymer material.

3. A system for a nacelle of an aircraft propulsion system, comprising:

a tubular outer structure;

a tubular inner structure projecting through a bore of the tubular outer structure; and a seal assembly configured to close an end of an annulus between the tubular outer structure and the tubular inner structure, the seal assembly including a seal land and a seal element;

the seal land comprising a seal land mount that circumscribes and is attached to the tubular inner structure, the seal land mount configured with a v-shaped sectional geometry, the seal land mount including an inner conical element and an outer conical element, an inner end of the inner conical element attached to the tubular inner structure, and an outer end of the inner conical element connected to an inner end of the outer conical element; and the seal element attached to the tubular outer structure, the seal element circumscribing and sealingly engaged with the seal land, and the seal element comprising a polymer material.

4. The system of claim 3, wherein the seal land mount is configured with the v-shaped sectional geometry in a plane that is parallel with a centerline of the tubular inner structure.

5. The system of claim 3, wherein the seal land further includes a seal land tube;

the seal land mount extends along a path from the tubular inner structure to the seal land tube, and a length of the path is at least four times greater than a shortest distance from the tubular inner structure to the seal land tube; and the seal element circumscribes and is sealingly engaged with the seal land tube.

6. The system of claim 3, wherein the seal land is configured to provide a restrictive heat conduction path from the tubular inner structure to an outer surface of the seal land; and the seal element circumscribes and contacts the outer surface of the seal land.

7. The system of claim 3, wherein the seal land further includes a seal land tube;

an outer end of the outer conical element is connected to and radially within the seal land tube; and the seal element circumscribes and contacts the seal land tube.

8. The system of claim 7, wherein the seal land further includes a second seal land mount;

the second seal land mount includes a second inner conical element and a second outer conical element;

an inner end of the second inner conical element is attached to the tubular inner structure;

an outer end of the second inner conical element is connected to an inner end of the second outer conical element; and an outer end of the second outer conical element is connected to and radially within the seal land tube.

9. The system of claim 3, wherein the seal land further includes a seal land tube;

the seal land mount connects the seal land tube to the tubular inner structure; and the seal element circumscribes and contacts the seal land tube.

10. The system of claim 3, wherein the seal element further includes fibrous material embedded within the polymer material.

11. The system of claim 3, wherein the seal assembly further comprises a second seal element attached to the tubular outer structure;

the second seal element circumscribes and is engaged with the seal land; and the second seal element comprising a metal material.

12. The system of claim 11, wherein the seal land further includes a seal land tube;

the seal land mount connects the seal land tube to the tubular inner structure; and the second seal element circumscribes and contacts the seal land tube.

13. The system of claim 11, wherein the seal land further includes a seal land tube and a plurality of cooling elements;

the seal land mount connects the seal land tube to the tubular inner structure; and the cooling elements are arranged circumferentially about the seal land tube, and each of the cooling elements projects radially out from the seal land tube.

14. The system of claim 13, wherein the second seal element circumscribes the seal land tube; and the second seal element axially contacts one or more of the cooling elements.

15. The system of claim 11, wherein the second seal element is configured as a turkey feather seal element.

16. The system of claim 11, wherein the seal element is clamped between the tubular outer structure and the second seal element.

17. A nacelle system for an aircraft propulsion system, comprising:

an outer structure;

an inner structure located in an aperture of the outer structure; and a seal assembly configured to seal a gap between the inner structure and the outer structure, the seal assembly including a seal land and a seal element;

the seal land including a seal land mount and a seal land tube connected to the inner structure by the seal land mount;

the seal land mount extending along a path from the inner structure to the seal land tube, wherein a length of the path is at least two times greater than a shortest distance from the inner structure to the seal land tube; and the seal element attached to the outer structure, the seal element circumscribing and sealingly engaged with the seal land tube, and the seal element comprising a polymer material.

18. The nacelle system of claim 17, wherein the outer structure comprises a tubular outer structure;

the seal assembly further includes a second seal element;

the second seal element is attached to the outer structure;

the seal element circumscribes and is sealingly engaged with the seal land; and the seal element comprises a metal material.

19. The nacelle system of claim 17, wherein the outer structure comprises a bulkhead;

the seal assembly further includes a second seal element;

the second seal element is attached to the outer structure;

the seal element circumscribes and is sealingly engaged with the seal land; and the seal element comprises a metal material.

20. A nacelle system for an aircraft propulsion system, comprising:

an outer structure;

an inner structure within an opening of the outer structure; and a seal assembly configured to seal a gap between the inner structure and the outer structure, the seal assembly including a seal land, a polymer seal element and a non-polymer seal element;

the seal land circumscribing and mounted to the inner structure, and the seal land configured to provide a restrictive heat conduction path from the inner structure to an outer surface of the seal land;

the polymer seal element and the non-polymer seal element attached to the outer structure at a common location;

the polymer seal element circumscribing and sealingly engaged with the outer surface of the seal land; and the non-polymer seal element circumscribing and sealingly engaged with the seal land.

* * * * *